(12) United States Patent
Yang

(10) Patent No.: US 6,988,835 B2
(45) Date of Patent: Jan. 24, 2006

(54) FIBER-OPTIC TRANSMITTING AND RECEIVING DEVICE

(76) Inventor: Johnson Yang, No. 93-1, Ciaohe Rd., Jhonghe City, Taipei County (TW)

( * ) Notice: Subject to any disclaimer, the term of this patent is extended or adjusted under 35 U.S.C. 154(b) by 0 days.

(21) Appl. No.: 10/849,735

(22) Filed: May 19, 2004

(65) Prior Publication Data

US 2005/0259926 A1    Nov. 24, 2005

(51) Int. Cl.
*G02B 6/42* (2006.01)

(52) U.S. Cl. ........................................... 385/92

(58) Field of Classification Search ............ 385/88–94
See application file for complete search history.

(56) References Cited

U.S. PATENT DOCUMENTS 4,778,240 A * 10/1988 Komatsu ..................... 385/88

* cited by examiner

*Primary Examiner*—Sarah U Song
(74) *Attorney, Agent, or Firm*—Charles E. Baxley

(57) ABSTRACT

A fiber-optic transmitting and receiving device is used on the mainstream fiber-optic system. A cover of which is used to cover the metal board and the metal tips of the fiber-optic transmitting and receiving device, the cover is formed with inserting grooves and inserting holes respectively corresponding to the metal board and the metal tips. The cover can protect the metal tips from damage and prevent short circuit. Furthermore, the independent feet are provided with check retainer which serves to engage in the sockets and the retaining holes on the transmitting and receiving head. Through this way, the independent feet can be firmly fixed, so as to prevent failures in assembly.

6 Claims, 8 Drawing Sheets

FIBER-OPTIC TRANSMITTING AND RECEIVING DEVICE

BACKGROUND OF THE INVENTION

1. Field of the Invention

The present invention relates to a fiber-optic transmitting and receiving device, which is used on mainstream fiber-optic system. A cover is used to cover a metal board and metal tips of the fiber-optic transmitting and receiving device, the cover is formed with inserting groove and inserting holes respectively corresponding to the metal board and the metal tips. The cover can protect the metal tips from damage and prevent short circuit. Furthermore, the independent feet, which are not covered by the cover, are provided with check retainers that are used to engage in the sockets and the retaining holes on the transmitting and receiving head. Through this way, the independent feet can be firmly fixed and so as to prevent failures in assembly.

2. Description of the Prior Arts

So far, all the fiber-optic transmitting and receiving heads are made of plastic. In this case, metal board should be used to synchronously produce positioning elastic force and a function of contact transmission when the fiber-optic transmitting and receiving head is positioned to other electronic elements. With reference to FIGS. 1 and 2, a conventional fiber-optic transmitting and receiving head 10 usually uses a metal board 11 to cover a recess 12 and the metal board 11 contacts the optic fibers inside the metal board. Through this way, the signal can be transmitted via the metal tip 13. The metal board 11 is provided at the inner side with elastic member so as to elastically fix the optic fibers. Furthermore, the conventional fiber-optic transmitting and receiving head 10 is formed with receiving recess 15 corresponds to the inner transmitting elements, and then U-shaped metal independent foot 16 is used to insert in the receiving recess 15. The receiving recess 15 is formed in a direction from which the independent foot 16 extends. The U-shaped portion 161 of the independent foot 16 can produce an elastic positioning effect. Such kind of fiber-optic transmitting and receiving device has been used for a long period of time, however, it still has some disadvantages that need to be improved as follows:

First, the metal board 11 is exposed since it directly covers the recess 12 of the fiber-optic transmitting and receiving head, thereby, the metal board 11 is inclined to contact a surface of the circuit board, which will lead to a short-circuit. The operator has to take time to reassemble it, besides, a potential danger may exist (a short circuit will be probably caused when the metal tip 13 of the metal board 11 contacts the circuit board).

Second, the metal tip 13 of the metal board 11 and the optic-transmitting leg 14 of the fiber-optic transmitting and receiving head 10 are very fragile, which are usually broken during assembly. Although the metal tip 13 is not dropped down, a bad contact between the metal tip 13 and the optic-transmitting leg 14 will be caused.

Third, due to the independent foot 16 is elastically positioned by elastic force produced by the U-shaped portion 161, when the independent foot 16 is welded with other electronic elements at a high temperature, the elastic force of the U-shaped portion 161 of the independent foot 16 will be affected by the high temperature. Furthermore, the independent foot 16 will probably be dropped out of the receiving recess 15 due to shortage of the elastic force of the U-shaped portion 161. Thus, the operator has to take time to reassembly the product.

Fourth, the independent foot 16 is positioned only by the elastic force, and the height at which the independent foot 16 to be positioned cannot be decided, during assembly, the operator is unable to decide the height where the independent foot 16 to be positioned. Thereby, the independent foot 16 is not easy to be fixed, this will result in a problem of bad contact.

The present invention has arisen to mitigate and/or obviate the afore-described disadvantages of the conventional fiber-optic transmitting and receiving device.

SUMMARY OF THE INVENTION

The primary object of the present invention is to provide a fiber-optic transmitting and receiving device capable of preventing improper short circuit. In which, the metal board of the fiber-optic transmitting and receiving head is covered with a cover, the cover is provided with bent arms that are used to fix the fiber-optic transmitting and receiving head.

The secondary object of the present invention is to provide a fiber-optic transmitting and receiving device that is easily assembled and firmly positioned. The independent foot of the fiber-optic transmitting and receiving device is provided with a check retainer adjacent to the bent portion. The check retainer is integrally formed and projected from the base body of the independent foot. On the peripheral sides of the fiber-optic transmitting and receiving head is formed with sockets and corresponding retaining holes. The above-mentioned structure is able to overcome the problem that the independent of the conventional fiber-optic head will be loosened, subject to high temperature.

Another object of the present invention is to provide a fiber-optic transmitting and receiving device that can be firmly positioned. In which, the metal tips of the fiber-optic transmitting and receiving device are covered with the cover, and the cover is formed with inserting grooves and inserting holes that are used to receive the metal board and the metal tips. Through this way, the cover is capable of protecting the metal tips from break.

The present invention will become more obvious from the following description when taken in connection with the accompanying drawings, which show, for purpose of illustrations only, the preferred embodiment in accordance with the present invention.

DETAILED DESCRIPTION OF THE PREFERRED EMBODIMENT

Figure 1:
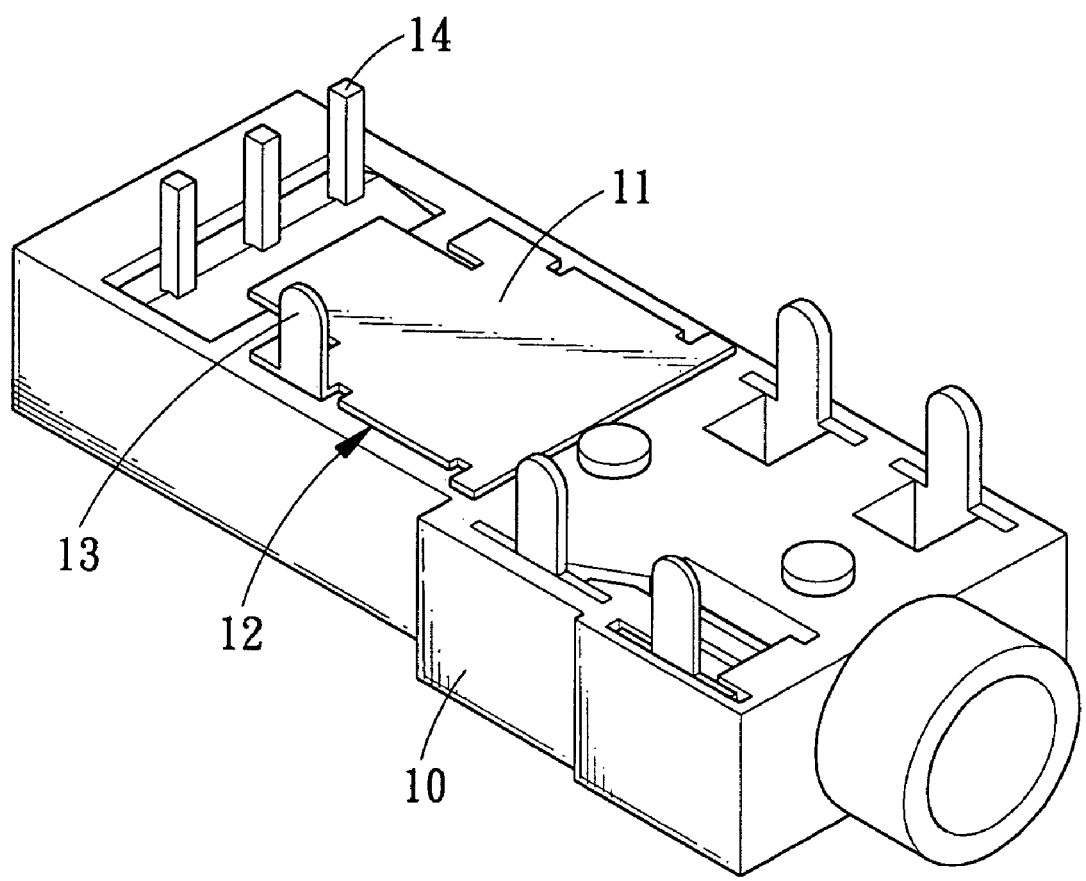
FIG. 1 is a perspective view of a conventional fiber-optic transmitting and receiving device.
Figure 2:
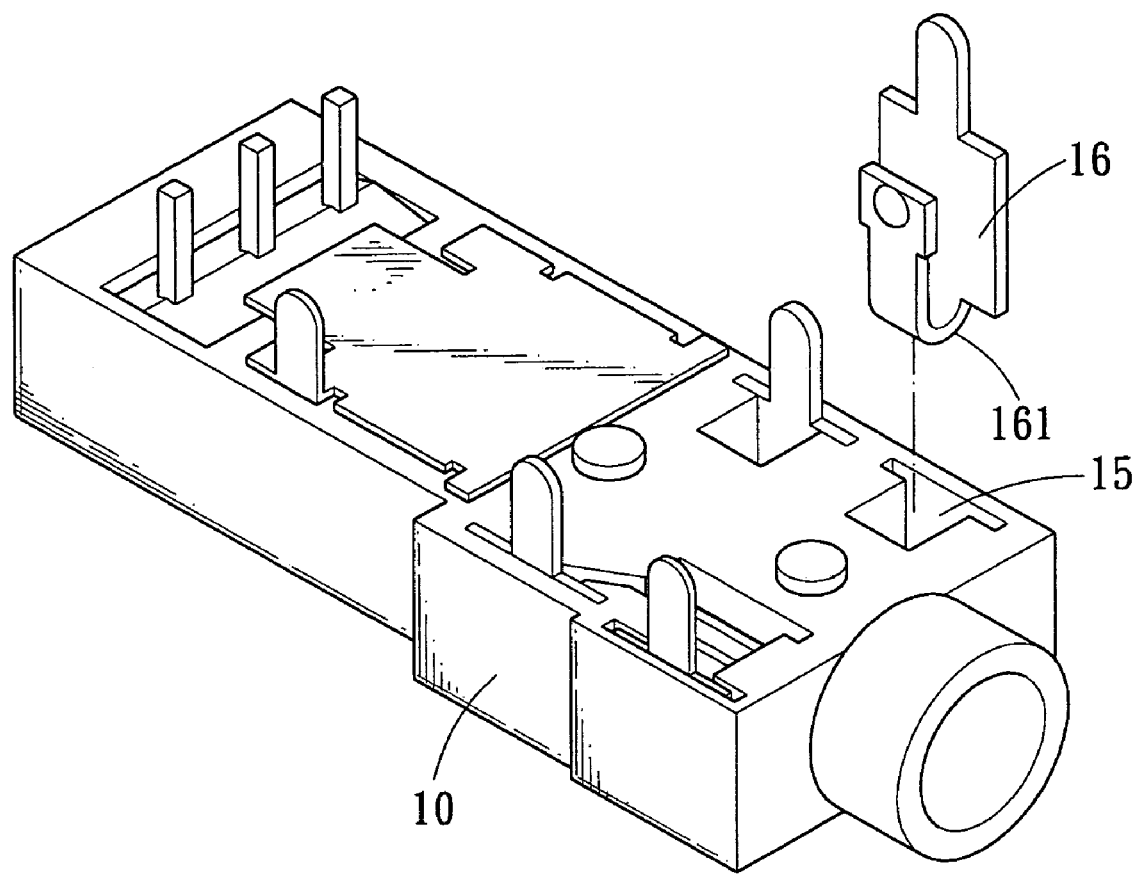
FIG. 2 is another perspective view of a conventional fiber-optic transmitting and receiving device.
Figure 3:
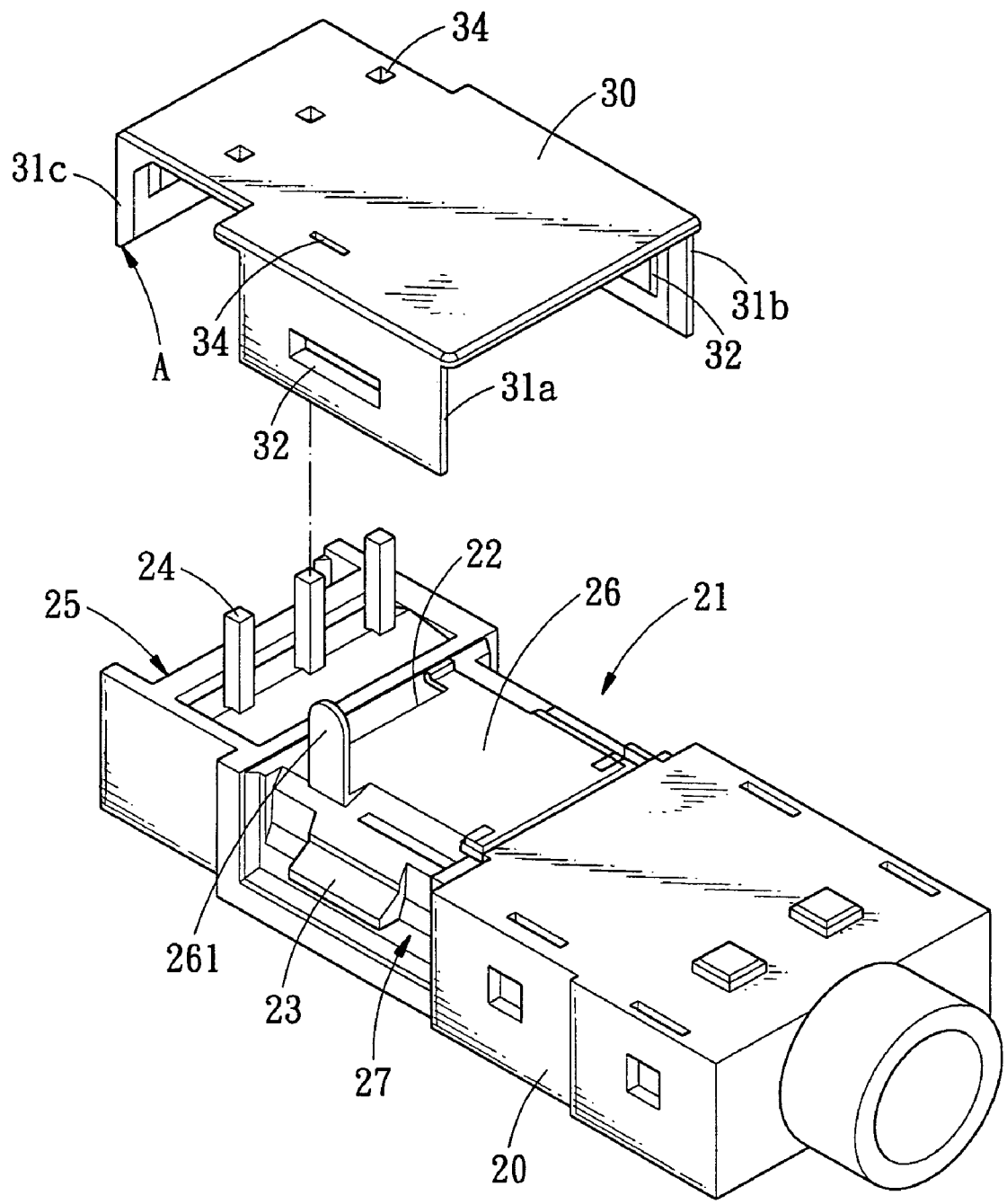
FIG. 3 is an exploded view of a fiber-optic transmitting and receiving device in accordance with the present invention.

Referring to FIGS. 3, 4, 6 and 7, a fiber-optic transmitting and receiving device in accordance with the present invention is shown and generally comprising a transmitting and receiving head 20, a cover 30 and a plurality of independent feet 40.

The transmitting and receiving head 20 is integrally formed, on which is formed with a Π-shaped socket 21, and at an end of the transmitting and receiving head 20 is provided with three optic-transmitting legs 24. The Π-shaped socket 21 corresponds to the fiber optic elements inside the transmitting and receiving head 20. On the periphery of topside of the socket 21 is provided with a groove 22, in which is received a metal board 26 having a metal tip 261. The metal tip 261 is folded and projected out of the surface of the metal board 26. On an end surface of the optic-transmitting legs 24 is defined with a recess 25, in both concave sides 27 of the Π-shaped socket 21 and in the recess 25 of the transmitting and receiving head 20 is respectively formed with a projection 23. The transmitting and receiving head 20 is further formed with sockets 28 that correspond to the connecting elements inside the transmitting and receiving head 20 and the opening direction is opposite to the assembly direction of the transmitting and receiving head 20. The sockets 28 are in communication with plural mounting holes 201 formed on another side of the transmitting and receiving head 20. A square retaining hole 29 is formed on an inner wall of the respective sockets 28 and open outward. The position of the square retaining hole 29 corresponds to the height that the sockets 28 to be positioned.

The cover 30 is a non-conductive plastic cover corresponds to the socket 21 of the transmitting and receiving head 20, on outer periphery of the cover 30 is provided with three bent arms 31a, 31b and 31c. The bent arms 31a and 31b respectively correspond to the both concave sides 27 of the Π-shaped socket 21 and the bent arm 31c corresponds to the recess 25 of the transmitting and receiving head 25. When the cover 30 covers the Π-shaped socket 21, the respective bent arms 31a, 31b and 31c will engage the projections 23 via a locking aperture 32, and the metal board 26 of the transmitting and receiving head 20 will be fully covered by the cover 30. The cover 30 is formed with inserting groove 33 so as to correspond to the metal board 26 of the transmitting and receiving head 20, and further formed with inserting holes 34 corresponding to the three optic-transmitting legs 24 and the metal tip 261. The respective inserting holes 34 will firmly abut the outer periphery of the optic-transmitting legs 24 and the metal tip 261.

The respective independent feet 40 are bent members integrally formed by metal material, each of which has a U-shaped bent portion 41 so as to produce a predetermined elastic force. A first end of the each of the independent feet 40 is a connecting end 42 and a second end of which is provided with an abutting block 43. A check retainer 41 is protruded out of a surface of the first end and located adjacent to the U-shaped bent portion 41. The U-shaped bent portion 41 and the independent feet 40 are used to insert firmly in the sockets 28 of the transmitting and receiving head 20, and the connecting end 42 inserts in the mounting holes 201 and the check retainer 44 inserts in the square retaining hole 29 of the sockets 28, so as to make the independent feet 40 contact the connecting elements of the transmitting and receiving head 20.

Figure 5:
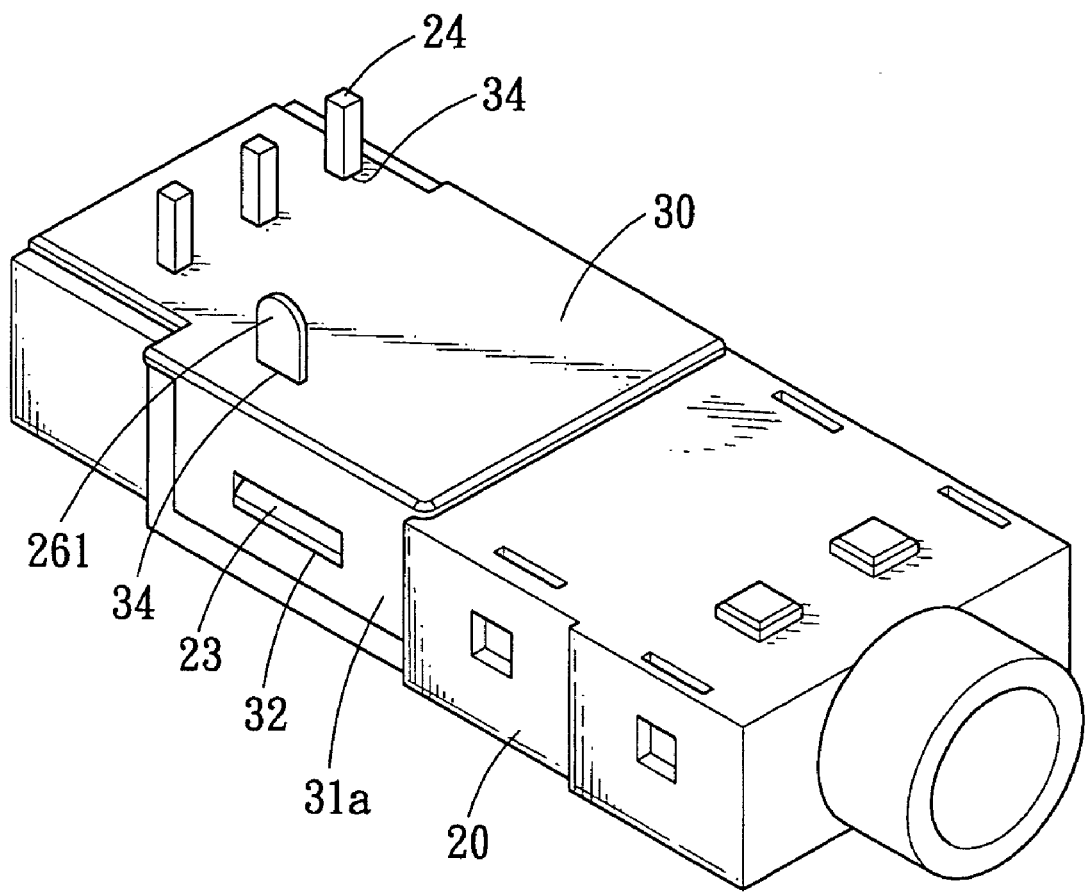
FIG. 5 is an assembly view of a fiber-optic transmitting and receiving device in accordance with the present invention.
Figure 6:
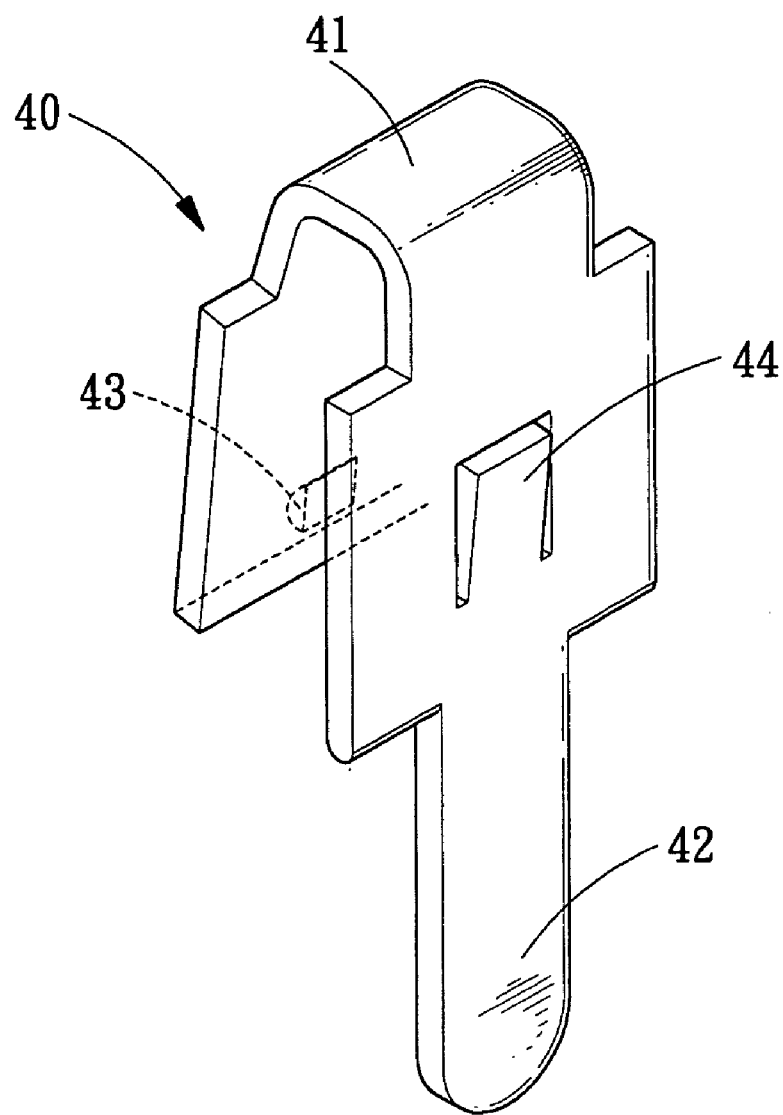
FIG. 6 is a perspective view of an independent foot in accordance with the present invention.
Figure 7:
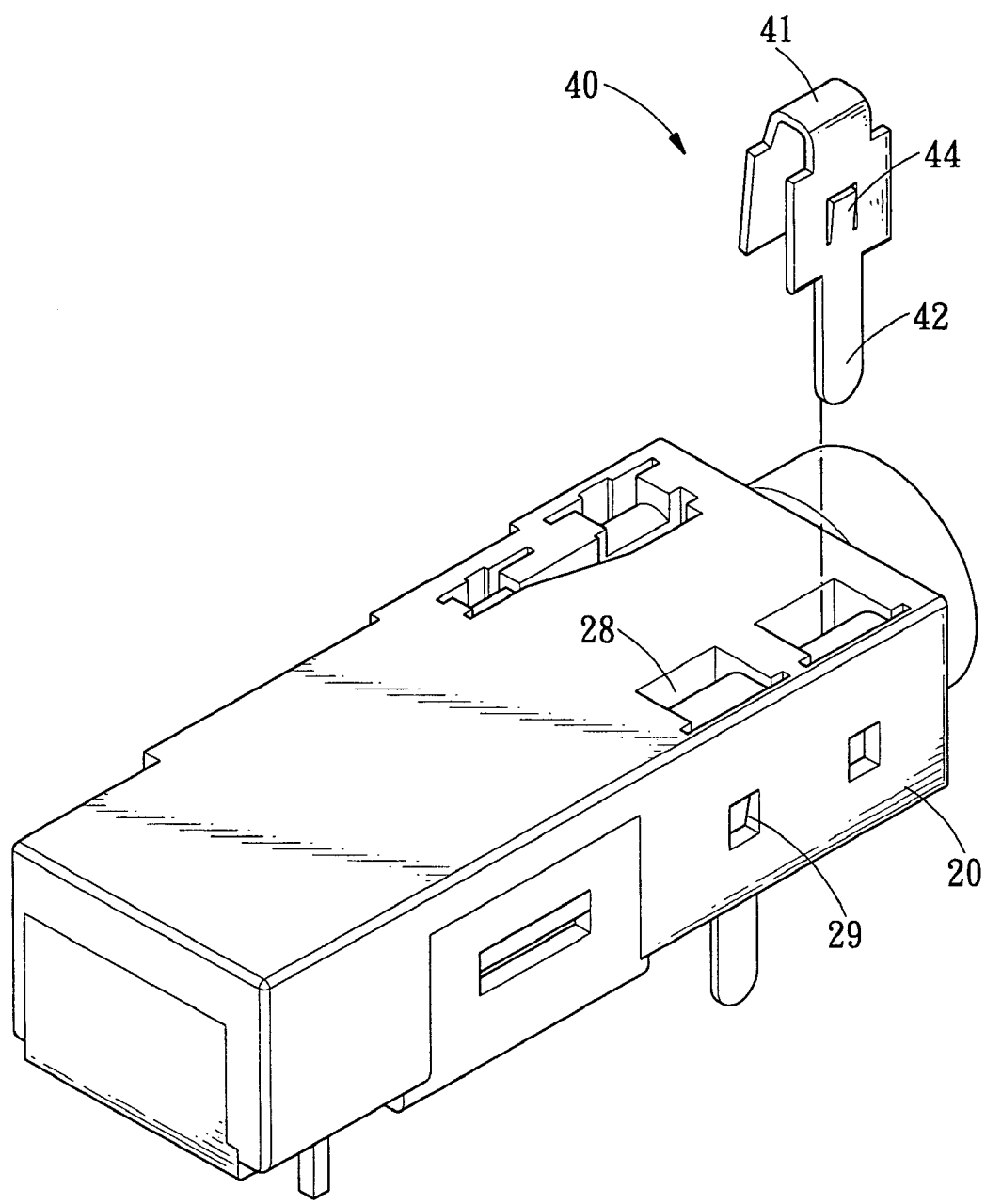
FIG. 7 is an exploded view of an independent foot in accordance with the present invention.

Referring to FIG. 5, the cover 30 is a non-conductive plastic cover corresponds to the socket 21 of the transmitting and receiving head 20, and on outer periphery of the cover 30 is provided with three bent arms 31a, 31b and 31c. Furthermore, the cover 30 fully covers the metal board 26 of the transmitting and receiving head 20. Thereby, the cover 30 ensures that the metal board 26 is isolated from the circuit board, so as to prevent short circuit. In this case, the transmitting and receiving head in accordance with the present invention is capable of preventing short circuit. On the other hand, the cover 30 is formed with inserting grooves 33 corresponding to the metal board 26, and further formed with inserting holes 34 corresponding to the three optic-transmitting legs 24 and the metal tip 261. In this case, the cover 30 can closely and firmly covers the transmitting and receiving head 20, and the respective inserting holes 34 will firmly abut the outer periphery of the optic-transmitting legs 24 and the metal tip 261. Thus, the metal tip 261 and the optic-transmitting legs 24 can be safely protected from damage and the failure in production and assembly can be reduced as well. Thereby, the transmitting and receiving head in accordance with the present invention is capable of effectively preventing assembly defects.

Figure 4:
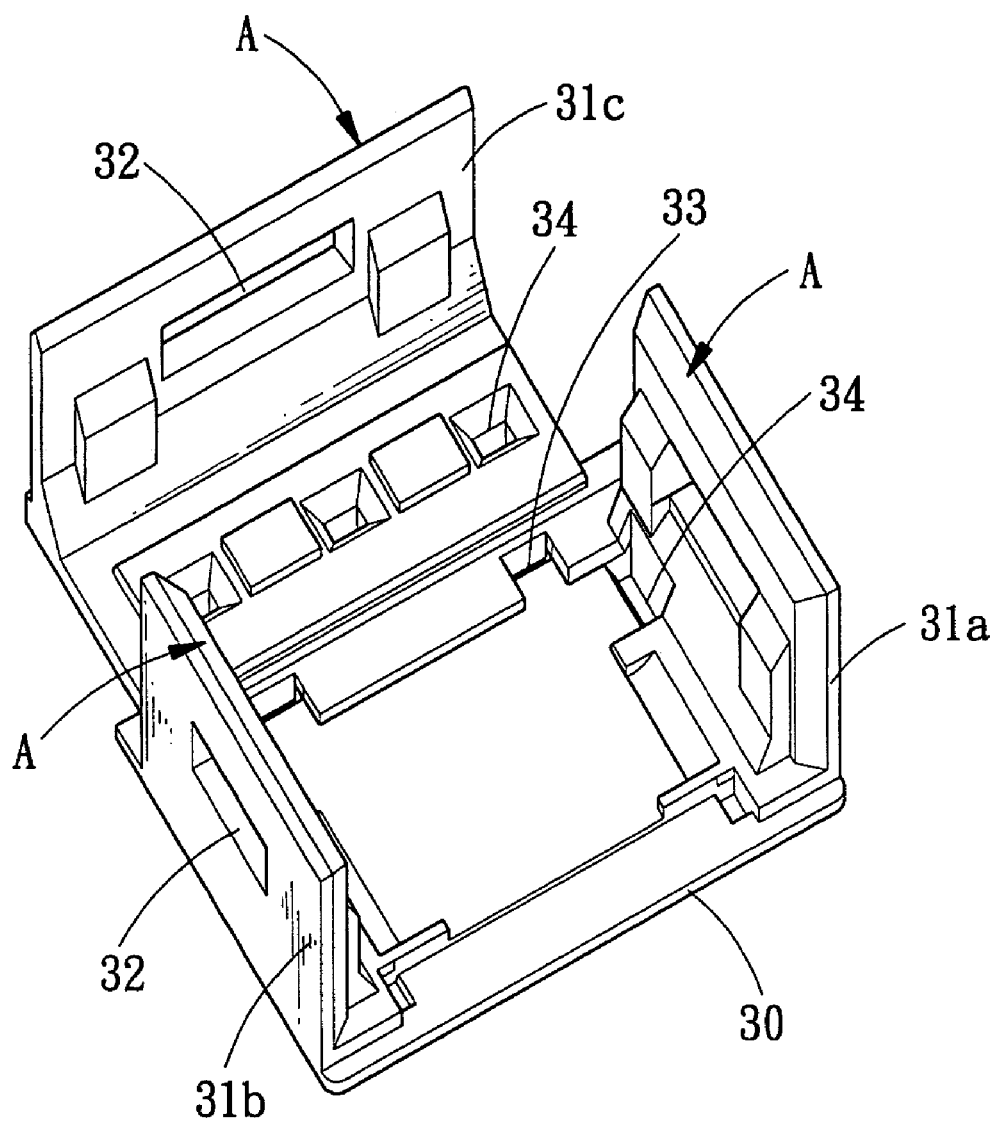
FIG. 4 is a partial perspective view of a fiber-optic transmitting and receiving device in accordance with the present invention.

Referring further to FIG. 4, the cover 30 must closely cover the Π-shaped socket 21, so the periphery of the cover 30 is formed with inclined locking surface A (the inner periphery of the inserting holes 34 also can be formed with inclined locking surface A). The inclined locking surface A enables the cover 30 to be easily covered on the transmitting and receiving head 20. The design of the inclined locking surface A makes the assembly easy and improve the tightness of the product.

Figure 8:
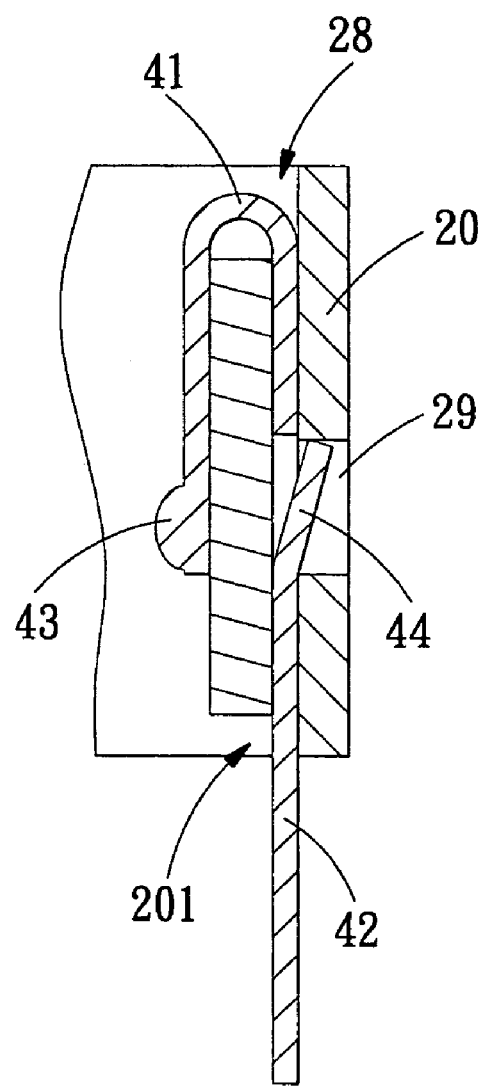
FIG. 8 is an assembly cross sectional view of an independent foot in accordance with the present invention.

Referring to FIG. 8, when assembling the independent feet 40, the user will insert the independent feet 40 in the socket 28 of the transmitting and receiving head 20 so as to make the connecting ends 42 protrude out of the mounting holes 201. The U-shaped bent portion 41 and the independent feet 40 are inserted firmly in the sockets 28 of the transmitting and receiving head 20, and the check retainer 44 is inserted in the square retaining hole 29 of the sockets 28. The independent feet 40 is precisely positioned when the check retainer 44 inserts in the square retaining hole 29, and the position of the independent feet 40 can be prevented from being affected by high temperature caused in soldering.

It is to be noted that the check retainer 44 is integrally formed and protruded from the independent feet 40. Thereby, the check retainer 44 is deformable after being compressed by the inner wall of the sockets 28, so as to make the insertion of the independent feet 40 inconvenient. And the check retainer 44 will be protruded out and fixed there automatically after entering the square retaining hole 29. Thus, the independent feet 40 are fixedly positioned.

While we have shown and described various embodiments in accordance with the present invention, it should be clear to those skilled in the art that further embodiments may be made without departing from the scope of the present invention.

What is claimed is:

1. A fiber-optic transmitting and receiving device comprising a transmitting and receiving head and a metal board, the transmitting and receiving head being formed with a plurality of optic-transmitting legs, plural independent feet and a groove for insertion of the metal board, and the metal board being formed with at least a metal tip; wherein:

the transmitting and receiving head is formed with a Π-shaped socket that is located correspondingly to the groove, the transmitting and receiving head is further formed with a recess, on both sides of the Π-shaped socket and in the recess is formed at least a projection;

a cover made of non-conductive plastic is provided on its outer periphery with a plurality of bent arms to be engaged in the Π-shaped socket and the recess of the transmitting and receiving head, the respective bent arms are formed with a locking aperture for engaging the projection of the transmitting and receiving head, the cover fully covers the metal board of the transmitting and receiving head and is formed with a plurality of inserting holes for insertion of the optic-transmitting legs and the metal tip of the transmitting and receiving head.

2. The fiber-optic transmitting and receiving device as claimed in claim 1, wherein an inserting groove for insertion of the metal board of the transmitting and receiving head is formed on an inner wall of the cover.

3. The fiber-optic transmitting and receiving device as claimed in claim 1, wherein the cover is formed on the periphery thereof with inclined locking surface which enables the cover to be easily covered on the transmitting and receiving head.

4. The fiber-optic transmitting and receiving device as claimed in claim 1, wherein the inserting holes is formed on its inner periphery with inclined locking surface which enables the optic-transmitting legs and the metal tip to be inserted through the inserting holes more smoothly.

5. The fiber-optic transmitting and receiving device as claimed in claim 1, wherein:
the transmitting and receiving head is formed with plural sockets for insertion of connecting elements inside the transmitting and receiving head, the sockets are in communication with plural mounting holes formed on another side of the transmitting and receiving head, a retaining hole is formed on an inner wall of the respective sockets and is located correspondingly to the height that the sockets to be positioned;
the plural independent feet are integrally formed bent members and made of metal material, a first end of the respective independent feet is a connecting end, a check retainer is protruded out of a surface of the first end and located adjacent to a U-shaped bent portion of the respective independent feet, and the U-shaped bent portion of the independent feet is inserted in the sockets of the transmitting and receiving head, the connecting end is inserted in the mounting holes and the check retainer is inserted in the retaining hole of the sockets.

6. The fiber-optic transmitting and receiving device as claimed in claim 5, wherein an abutting block is provided on each of the independent feet and serves to insert in the sockets of the transmitting and receiving head.

* * * * *